US008475858B2

(12) United States Patent   (10) Patent No.: US 8,475,858 B2
Hairsine et al.   (45) Date of Patent: *Jul. 2, 2013

(54) METHODS FOR AUTOMATICALLY MAKING LARGE QUANTITIES OF PRE-COOKED EGGS HAVING A NATURAL APPEARANCE

(75) Inventors: Alan E. Hairsine, Gaylord, MN (US);
Jason W. Mathews, Gaylord, MN (US);
Ted A. Kurpgeweit, Wayne, NE (US);
Dale E. Weaver, Lenox, IA (US)

(73) Assignee: Michael Foods, Inc., Minnetonka, MN (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/842,233

(22) Filed: Jul. 23, 2010

(65) Prior Publication Data

US 2010/0291271 A1   Nov. 18, 2010

Related U.S. Application Data

(63) Continuation of application No. 10/741,793, filed on Dec. 19, 2003, now Pat. No. 7,763,302.

(51) Int. Cl.
*A23L 1/32*   (2006.01)
(52) U.S. Cl.
USPC ........... 426/298; 426/614; 426/515; 426/478; 426/481
(58) Field of Classification Search
USPC .................................. 426/298, 614, 515, 478
See application file for complete search history.

(56) References Cited

U.S. PATENT DOCUMENTS

| | | | |
|---|---|---|---|
| 1,494,602 A | 5/1924 | Jenkins | |
| 1,727,493 A | 9/1929 | Tranin | |
| 1,925,700 A | 9/1933 | Matter | |
| 2,314,741 A * | 3/1943 | Sigler | 99/509 |
| 2,497,280 A | 2/1950 | Stier | |
| 2,722,173 A | 11/1955 | Dorr | |
| 2,760,536 A * | 8/1956 | Willsey | 99/498 |
| 3,480,056 A * | 11/1969 | Willsey | 99/498 |
| 3,640,732 A | 2/1972 | Johnson | |
| 3,843,825 A | 10/1974 | Hawley | |

(Continued)

FOREIGN PATENT DOCUMENTS

| | | |
|---|---|---|
| EP | 0317349 | 5/1989 |
| JP | 356151457 | 9/1981 |

(Continued)

*Primary Examiner* — Anthony Weier
(74) *Attorney, Agent, or Firm* — Zollinger & Burleson Ltd.

(57) ABSTRACT

The present invention includes methods and devices for mass producing cooked, cooled egg products having a grill fried egg appearance. One device includes a portion for positioning whole, intact, shelled eggs positioned laterally across and above a cooking mold conveyor, and a portion for cracking the eggshells and depositing the eggs into cooking molds on the conveyor. Some devices and methods include an egg yolk splitter for rupturing the egg yolk sac to deposit a whole egg having a ruptured egg yolk into each mold. Other devices and methods include irregular shaped egg molds for providing a mass produced cooked egg having a natural, irregular shaped outlines and/or surfaces. Devices and methods according to the present invention can be used to produce irregular, outlined shaped cooked egg products including whole eggs, formulated eggs, or eggs made from scrambled egg mixes. The pre-cooked eggs can be delivered pathogen free to fast food establishments and reheated for consumers in less time than required to cook the egg.

24 Claims, 10 Drawing Sheets

U.S. PATENT DOCUMENTS

| | | |
|---|---|---|
| 3,941,892 A | 3/1976 | Glasser et al. |
| 3,958,035 A | 5/1976 | Stearns et al. |
| 4,000,323 A | 12/1976 | Youngquist |
| 4,046,922 A | 9/1977 | Burkwall, Jr. |
| 4,068,570 A | 1/1978 | Lanoie |
| 4,137,838 A | 2/1979 | Warren |
| 4,321,864 A | 3/1982 | Willsey |
| 4,411,574 A | 10/1983 | Riley |
| 4,419,962 A | 12/1983 | Siciliano |
| 4,425,367 A | 1/1984 | Berkowitz et al. |
| 4,487,321 A | 12/1984 | Bliss |
| 4,488,637 A | 12/1984 | Loeffler |
| 4,505,373 A | 3/1985 | Thomas |
| 4,512,250 A | 4/1985 | Schindler et al. |
| 4,519,494 A | 5/1985 | McEvoy et al. |
| 4,519,505 A | 5/1985 | Thomas |
| 4,554,866 A * | 11/1985 | Hampton ................. 99/499 |
| 4,569,444 A | 2/1986 | McEvoy et al. |
| 4,711,425 A | 12/1987 | Spiel et al. |
| 4,750,316 A | 6/1988 | Bliss |
| 4,765,487 A | 8/1988 | Bliss |
| 4,776,465 A | 10/1988 | McEvoy et al. |
| 4,889,741 A | 12/1989 | Timmons et al. |
| 4,961,946 A | 10/1990 | Shimizu |
| 5,069,119 A | 12/1991 | Idowu et al. |
| 5,227,189 A | 7/1993 | Vassiliou |
| 5,293,021 A | 3/1994 | Davis |
| 5,427,016 A | 6/1995 | Dunckel |
| 5,438,919 A * | 8/1995 | Idowu ........................... 99/499 |
| 5,483,872 A | 1/1996 | Nield |
| D373,234 S | 9/1996 | Manderfeld |
| D376,251 S | 12/1996 | Manderfeld |
| 5,617,782 A | 4/1997 | Thomas |
| 5,620,735 A | 4/1997 | Manderfeld et al. |
| 5,628,246 A | 5/1997 | Kristensen |
| 5,636,726 A | 6/1997 | Nield |
| 5,665,416 A | 9/1997 | Manderfeld et al. |
| 5,858,434 A | 1/1999 | Thomas |
| 5,932,276 A | 8/1999 | Bhatia et al. |
| 6,029,424 A | 2/2000 | McEvoy et al. |
| 6,056,341 A | 5/2000 | Bliss |
| 6,234,070 B1 | 5/2001 | Hutchison et al. |
| 6,237,978 B1 | 5/2001 | Bliss |
| 2002/0041920 A1 | 4/2002 | Fernandez |
| 2003/0047838 A1 | 3/2003 | Beale et al. |
| 2003/0134030 A1 | 7/2003 | Merkle et al. |
| 2003/0224098 A1 | 12/2003 | Mathews |

FOREIGN PATENT DOCUMENTS

| | | |
|---|---|---|
| JP | 9-65978 | 3/1997 |
| JP | 10-28539 | 2/1998 |
| JP | 410146170 | 6/1998 |
| JP | 2001-17126 | 1/2001 |
| WO | 87/03171 | 6/1987 |

* cited by examiner

METHODS FOR AUTOMATICALLY MAKING LARGE QUANTITIES OF PRE-COOKED EGGS HAVING A NATURAL APPEARANCE

CROSS-REFERENCE TO RELATED APPLICATION

This application is a continuation of U.S. application Ser. No. 10/741,793 filed on Dec. 19, 2003, now issued as U.S. Pat. No. 7,763,302, the entire contents of which are incorporated by reference herein.

FIELD OF THE INVENTION

The present invention is related generally to food processing. More specifically, the present invention is related to egg cooking methods and devices for mass producing cooked egg products.

BACKGROUND OF THE INVENTION

Individuals increasingly eat food away from home, or at home, at work, or even in an automobile, where the food was at least partially prepared or precooked outside at the home. Grill fried eggs are well known and have been made for centuries. Consumers prepare grill fried eggs at home, and also eat grill fried eggs prepared in eating establishments. The grill fried eggs are aesthetically pleasing to consumers, perhaps because grill fried eggs have the appearance of home cooked food and/or food prepared at well-established restaurants.

Many consumers demand eggs prepared at ever-increasingly short time intervals. Some consumers expect cooked eggs to be made available in the time between ordering a product at a speaker post, and the arrival of their automobile at a drive-up window in a fast food establishment. Other consumers expect eggs to be made available shortly after paying for the eggs at the counter of a fast food restaurant, expecting to receive the cooked eggs in less than the time required to cook the eggs, for example, within one minute.

Some fast food restaurants grill fry eggs ahead of time, prior to their being ordered. One such fast food restaurant uses a three-inch ring, open at the bottom, in sets of six. These are put on the grill, the egg deposited in the ring, then covered and steamed. These restaurant prepared eggs, while nutritious, do not closely resemble home, grill fried eggs. They are also made prior to being ordered, allowing for the possibility of wastage if they are not sold within an allotted time period.

Another fast food establishment uses a three and one-quarter inch ring, breaks the egg, puts the egg into the ring, breaks the yolk, and partially cooks the egg. The partially cooked egg is flipped over in the ring, and the ring removed. This allows the remainder of the egg to cook and flow outwardly somewhat. This method also requires the eggs to be made ahead of the short time demanded by some consumers, with the cooked eggs being readily distinguishable from an irregular or randomly shaped, home grill fried egg.

Such cooking methods suffer from drawbacks. Firstly, if the eggs are to be delivered to consumers in a time period less than the time required to break the eggs, cook the eggs, and package the cooked egg product, then the eggs must be cooked prior to the time of ordering. This allows for some wastage, as previously discussed. Secondly, while modern eggs are typically very safely delivered from almost all vendors, the possibility exists for some pathogens being carried with the eggs. While this occurrence is extremely rare, it has happened. Thirdly, the manual preparation of grill fried eggs is somewhat time and labor consuming. In some situations, the cooking grill would not otherwise be required but for the requirement for cooking the grill fried eggs.

What would be desirable are methods and devices for mass producing pre-cooked, cooled eggs that resemble grill fried eggs. Such eggs could be mass produced in a controlled environment to substantially reduce the chance of pathogen contamination. The mass produced, precooked, cooled eggs would preferably resemble home cooked grilled eggs. If mass produced, grill fried eggs were made available, fast food eating establishments could save on labor, and reduce wastage by reheating the previously cooked egg products. What would be most desirable are pre-cooked, cooled, egg products that resemble home, grill fried eggs that could be prepared at a fast food establishment in less than the time required to cook the eggs.

SUMMARY OF THE INVENTION

The present invention provides methods for mass producing cooked, cooled eggs having a grill fried egg appearance. One method includes depositing an egg product into a plurality of mold depressions, wherein the molds have irregular shaped boundaries. Another method includes depositing an egg product into a plurality of mold depressions having an irregularly varying depth and bottom surface. The methods can further include cooking the deposited egg products in the molds, removing the cooked egg products from the molds, and cooling the cooked egg products below room temperature. Some methods include depositing whole eggs with intact yolks, while other methods include depositing whole eggs having broken yolks. The methods may include allowing the yolk to settle into a minor depression located within the major depression of the mold. In some methods, the yolks are broken by dropping the whole eggs through an egg yolk rupturing device having sharp edges. Still other methods include depositing scrambled egg products or formulated egg products.

In some methods, the mold depressions are arranged side to side in a pan along a width dimension, and the pans arranged end to end along a length dimension, in which the depositing includes depositing a plurality of eggs along the width into the plurality of mold depressions at substantially the same time. The depositing can occur when the mold pans are moving. In some methods, the shelled eggs are located a first distance apart while the eggs are broken, and are diverted to a second distance apart, further apart than the first distance, to be deposited into mold depressions located approximately the second distance apart on center.

The present invention provides a method for breaking egg yolks including dropping the egg yolks through a device for rupturing the egg yolk sacs. In some methods, the device includes an orifice having sharp edges, and the method includes dropping the egg yolks through the orifice having the sharp edges. Some devices include a plate having an orifice with sharp inwardly protruding edges, and the method can include dropping the egg yolks through the orifice having the sharp edges. In some methods, the device has a plurality of orifices, and can receive a plurality of egg yolks simultaneously. The plurality of orifices can be arranged in a side by side pattern. In some methods, the egg yolk sac rupturing device has a plurality of orifices each disposed in a downwardly extended or depressed plate portion.

The present invention further provides an egg mold for producing eggs having irregular shaped peripheries, the mold including a planar surface having a depression therein, wherein the depression has an irregularly shaped outline. In some molds, the depression outline is asymmetric about any vertical plane drawn through the planar surface and the depression. The mold is preferable formed of a nonstick, food grade material, at least at the surface. Some egg molds are formed as a plurality of depressions in the planar surface of an egg mold pan.

Some molds have a top surface and include a first depression having a first bottom surface and a first depth relative to the top surface, and also include a second depression having a second bottom surface and a second depth relative to the top surface. The first and/or second bottom surface depth can vary over the respective surface. In some molds the second depression has a surface area at least 1/10th or 1/6th the surface area of the first depression. The second depression can have a mean depth of at least 1/4 or 1/3 greater than the mean depth of the first depression. The yolk, either intact, broken, or formulated, can be allowed to settle into the second depression, providing a cooked egg product having a prominent cooked yolk.

A device for mass producing cooked, fried eggs is also provided by the present invention. One device includes an egg breaking device comprising a plurality of vertically oriented, side-by-side, egg carousels, where the egg carrying carousels each have a plurality of egg carrier cups rotatably disposed about a horizontal central axis, the egg carrier carousels traveling along a closed loop partly lying within a vertical plane. The device can further comprise an eggshell breaking knife for breaking the eggshells while the eggs are disposed within the egg carrying cups. The device can also include a moving belt including a plurality of pans, with each pan having a plurality of egg cooking mold depressions disposed side-by-side therein. The molds can be disposed to each receive a falling egg from the egg breaking device. In some devices, the molds are disposed directly under the egg carrying cups at the point at which the shells are broken. Other devices include chutes or deflectors to deflect the falling eggs from the egg carrying cups laterally outward to a distance further apart than the egg carrying cups are located from each other, to insure depositing the falling eggs into the molds. In still other devices, an egg yolk breaking device having an orifice for receiving a falling liquid whole egg and having sharp edges for rupturing the egg yolk sack of the falling egg yolk is disposed between the egg carrying cup and the cooking mold. In some devices, the molds have an irregular outline shape, as previously described.

The present invention also provides a cooked, cooled egg product comprising a plurality of cooked egg products having a substantially planar shape and having an irregular shaped outline, in which a substantial portion of the eggs have the same irregular shaped outline, in which the cooked egg products have a temperature of less than 30° centigrade. The cooked egg products are whole eggs having intact yolks in some embodiments, are whole eggs having broken yolks in other embodiments, are scrambled eggs in still other embodiments, and are formulated egg products in yet other embodiments. Some egg products have an irregular shaped surface having an irregularly varying height over the product. Other egg products are cooked formulated eggs having a formulated egg yolk portion and/or a formulated egg white portion, resembling a sunny-side-up fried egg. This product can be made by depositing the formulated yolk into a secondary mold depression and depositing the formulated egg white into a primary mold depression having the secondary depression within.

The present invention also includes methods for making cooked whole eggs including automatically conveying eggs to an egg breaking location, automatically breaking the egg shells of the whole eggs, allowing the contents of one egg shell to fall into one mold, automatically conveying each mold into a heated area, and cooking the egg contents in each mold in the heated area.

Some automatic methods include methods for making cooked whole eggs by mechanically conveying a plurality of whole, shelled eggs, mechanically breaking the conveyed plurality of egg shells, allowing the egg contents to fall into a plurality of molds, mechanically conveying the molds containing the egg contents into a heating area, and cooking the egg contents in the molds. Each mold receiving egg content preferably receives one and only one whole egg content. The mechanical methods can include mechanisms selected from the group consisting of purely mechanical, pneumatic, electrical, magnetic, hydraulic, and electro-mechanical mechanisms and combinations thereof. Some methods include mechanically carrying each egg in an egg carrier, mechanically breaking the egg shell with a knife, and moving a belt or loop formed of linked articulated molds into the heating area. The molds used and the resulting cooked eggs can have round outlines, symmetrical outlines, irregular outlines, irregular surfaces, and/or two different and nested levels of surfaces.

The present invention provides, generally, a device for mass producing cooked eggs having a grill fried egg appearance. The device includes a first part for positioning eggs in a spaced apart relationship from each other and for breaking the eggshells, allowing the whole egg products within to fall. The device also includes a second part, including a belt having a plurality of egg cooking molds disposed to capture the falling, whole egg products within the molds. The molds can be disposed on a longitudinally moving belt, which can propel the deposited eggs in the cooking molds toward an oven.

DETAILED DESCRIPTION OF THE PREFERRED EMBODIMENTS

Figure 1:
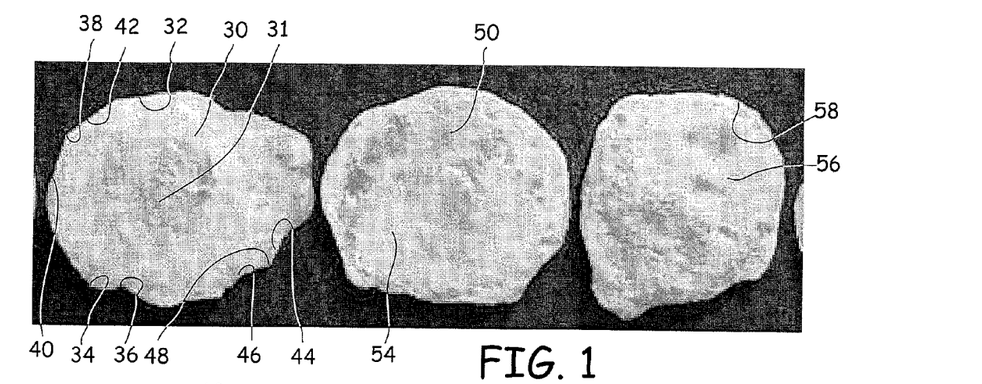
FIG. 1 is a photograph of three natural whole eggs having broken yolks and an irregular outline or periphery.

FIG. 1 is a photograph illustrating three cooked, whole, natural eggs having irregular outlines made by a method of the present invention, that resemble flat grill fried eggs. FIG. 1 includes a first egg 30 having a yolk 31 and an irregular outline or periphery 32. The irregular outline 32 may be seen to be irregular, and is not round, square, rectangular, or oval. As may be seen from inspection of FIG. 1, there is no axis of symmetry that can be drawn through egg 30 that will result in a mirror image being formed on either side of the axis of symmetry.

Irregular outline 32, in the embodiment illustrated, includes outward or convex protuberance 34 and inward or concave region 36. Convex protuberance 34 and concave protuberance 36 may be seen to be substantially rounded in appearance. Another outward vertex 38 may be seen, being formed between a first substantially straight region 40 and a second substantially straight region 42. Yet another outward protuberance or convex region 48 may be seen formed between a first concave region 44 and a second concave region 46. A broken yolk 31 may be seen within egg 30. The present invention includes both eggs having broken and unbroken yolks.

FIG. 1 also includes a second whole, cooked natural egg 50 having an irregular outline and a broken yolk 54. A third, whole, cooked natural egg 56 may be seen, also having an irregular outline 58. Eggs 30, 50, and 56 may all be seen to have different irregular outlines.

Figure 2:
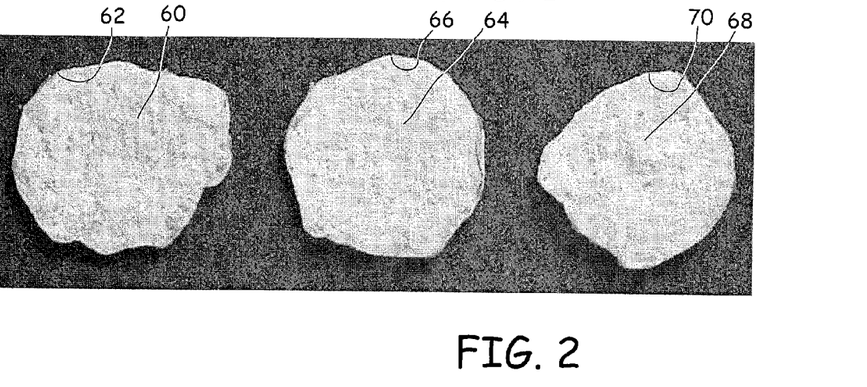
FIG. 2 is a photograph of three cooked eggs having irregular outlines made from scrambled egg mix.

FIG. 2 illustrates three cooked eggs product formed from a scrambled egg mix. A first scrambled egg 60 having an irregular outline or periphery 62 may be seen. A second scrambled egg 64 having an irregular outline 66 is also present in FIG. 2. A third scrambled egg 68 may also be seen, having an irregular outline or periphery 70.

Figure 3:
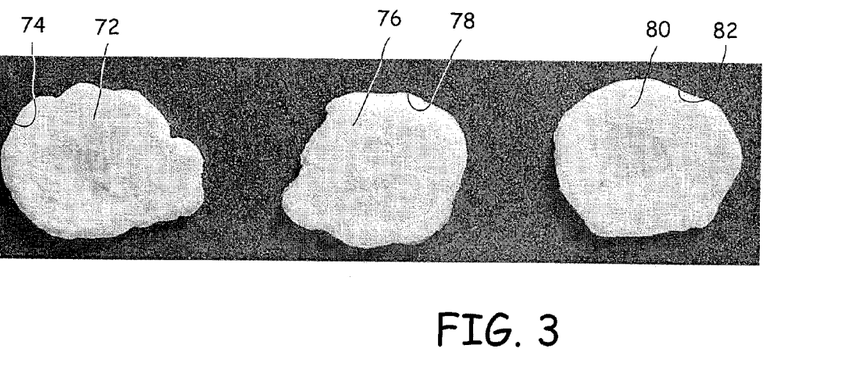
FIG. 3 is a photograph of three formulated eggs having irregular shaped outlines.

FIG. 3 illustrates three formulated eggs made according to the present invention. A first formulated egg 72 having an irregular outline 74 may be seen. A second formulated egg 76 having an irregular outline or periphery 78 is also illustrated in FIG. 3. A third formulated egg 80 having irregular outline 82 may also be seen. Formulated eggs are well known to those skilled in the art. Formulated eggs can be made by cracking whole eggs, separating or substantially separating the yolk and the albumin, and recombining the yolk and the albumin components to form a cooked egg product resembling a natural, whole, grilled fried cooked egg. The formulated eggs can have the albumin and/or the yolk component modified by the addition of substances, for example, gums. The albumin and/or yolk may also be partially or totally replaced. In one such example, the yolk may be replaced with a food product resembling a natural yolk, but having a substantially reduced cholesterol component.

Figure 4:
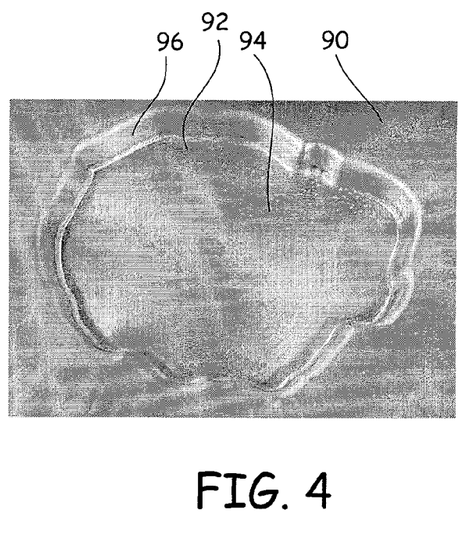
FIG. 4 is a photograph of a mold having an irregular shaped outline that can be used to make some of the irregular shaped eggs in FIGS. 1-3.

FIG. 4 illustrates a first mold 90 having an irregular outline 92 that can be used to form and cook the cooked egg products, for example, eggs 30, 60, and 72 of FIGS. 1, 2, and 3, respectively. Mold 90 can be made by punching a sheet metal material with an irregular outline stamp or punch, resulting in the irregular shaped outline 92 seen in FIG. 4. A vertically beveled or stepped periphery 96 may be seen in FIG. 4 as well. Mold 90 can include a substantially flat bottom surface 94. Mold 90 can further be coated with a food grade, non-stick material, for example, Teflon (PTFE).

Figure 5:
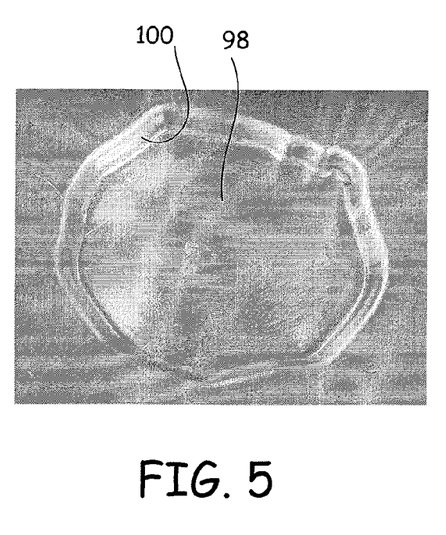
FIG. 5 is a photograph of another mold having an irregular shaped outline that can be used to make some of the irregular shaped eggs of FIGS. 1-3.

FIG. 5 illustrates a second mold 98 having an irregular outline 100 that can be used to make cooked eggs having an irregular outline, for example, eggs 50, 64, and 80 of FIGS. 1, 2, and 3, respectively.

Figure 6:
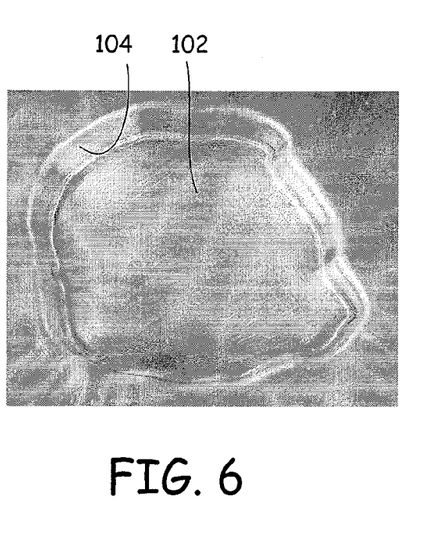
FIG. 6 is a photograph of yet another mold having an irregular shaped outline or periphery that can be used to make some of the eggs of FIGS. 1-3.

FIG. 6 illustrates a third mold 102 having an irregular outline 104 that can be used to make cooked egg products, for example, eggs 56, 68, and 76, of FIGS. 1, 2, and 3, respectively.

Referring again to FIGS. 1 through 6, the present invention includes methods to include a pre-cooked egg product with a shape that simulates that of a fresh egg product that has been cooked on a flat grill surface. This method can utilize a pan with an irregular shaped mold in which the liquid egg product is deposited. The molds of FIGS. 4 through 6 have been designed from actual egg products cooked on a grill to provide a finished product that simulates this irregular shape. The liquid egg product can be deposited into pans having the irregular mold formed as part of the pan. This egg product can then be cooked in the pan to a minimum temperature of 170 degrees Fahrenheit. The cooked egg product can then be cooled. This method includes both frozen and refrigerated products, and includes, but is not limited to, the cooking of natural whole eggs, scrambled egg mixes, and formulated eggs.

The irregular shaped cooked egg products of FIGS. 1 through 3 can provide a natural looking egg product that more closely resembles that of products cooked on a flat grill. The end user can rapidly reheat this product and provide a more natural looking product without having to cook a liquid egg product on a grill. The precooked, cooled eggs made according to the present invention can be more easily delivered pathogen free to the end user. Wastage can be reduced as the individual eggs can be heated on an as-needed basis.

Another aspect of the present invention includes methods for making cooked egg products having broken yolks and the cooked egg products made according to these methods. The time required to fully cook the yolk portion of a fried egg with intact yolk exceeds the time required to fully cook the white portion due to the increased thickness of the yolk. This can result in overcooking of the white portion of the egg in order to fully cook the yolk. The present invention includes a method for breaking the yolk in order to minimize the differences in thickness associated with an egg with an unbroken yolk. This method also improves process efficiencies by reducing the total amount of time necessary to fully cook the egg to an internal temperature of 170 degrees Fahrenheit. The time required to cook an egg with an unbroken yolk can be between 25 percent and 75 percent longer than cooking an egg that has a broken yolk. The cooking of the egg with a broken yolk also results in a more uniform cooking of the egg, which results in improved texture.

Figure 7:
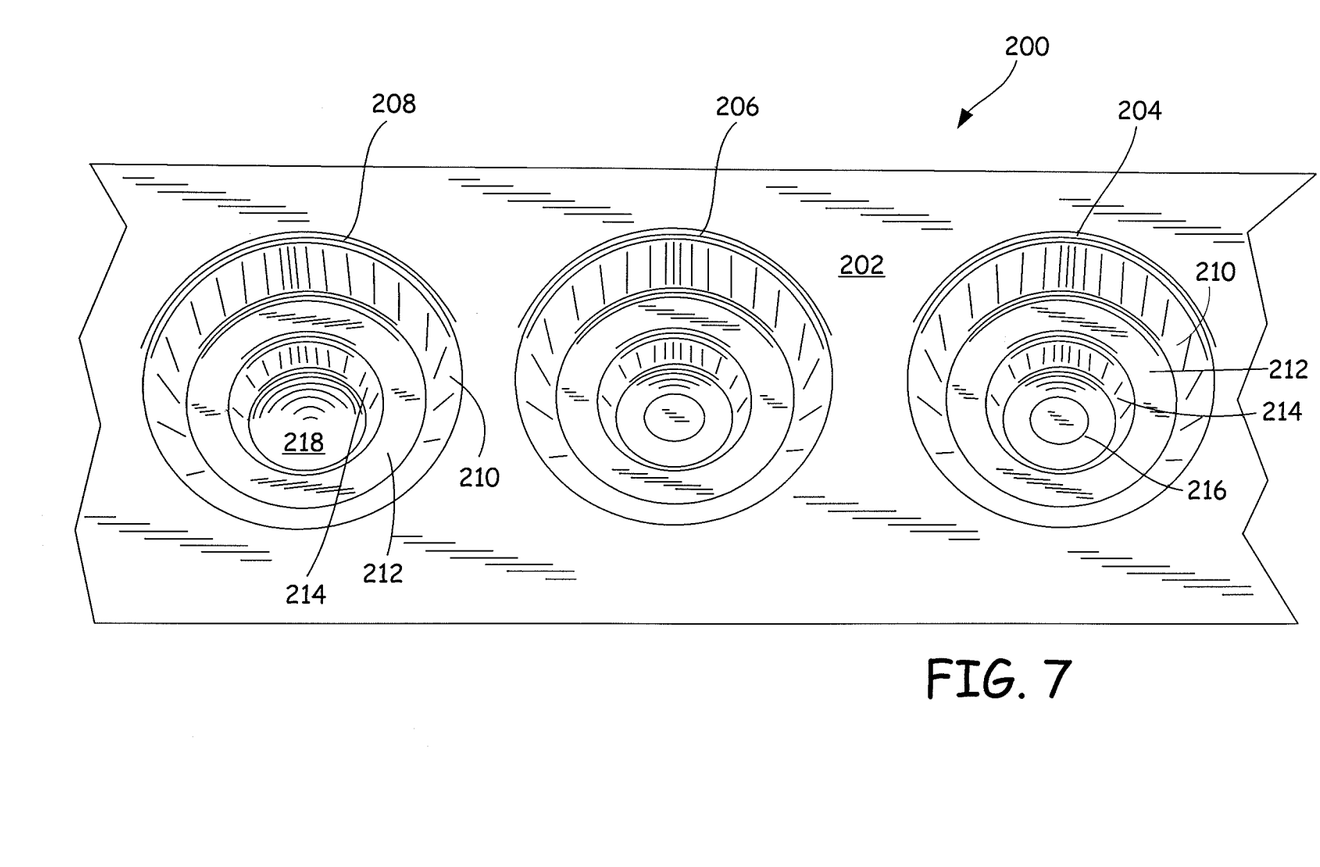
FIG. 7 is a perspective view of a pan having three molds each having a first depression and a second depression with the first depression.

FIG. 7 illustrates a pan 200 including a top planar surface 202 and three egg molds 204, 206, and 208 therein. Molds 204 and 206 are similar while mold 208 is somewhat different.

Mold 204 includes a first downwardly extending or sloped region 210 followed by a first planar horizontal region 212. Planar region 212 is followed by a second downwardly sloped or extending region 214 followed in turn by a bottom cupped or rounded region 216. A first or primary depression is thus formed by first sloped region 210 and first planar region 212. A second or secondary depression is thus formed by second sloped region 214 and bottom cupped or rounded region 216. Mold 208 includes regions 210, 212, and 214, as discussed with respect to mold 204. Mold 208 includes a bottom flat region 218, rather than a bottom rounded region 216 as in mold 204. Mold 208 includes a second or secondary depression formed from second sloped region 214 and bottom flat region 218.

In some embodiments, the second depression has a surface area of at least about $1/10^{th}$ or $1/6^{th}$ the surface area of the first or primary depression. As used herein, the term "surface area" refers to the projection of the surface area onto the top planar surface 202. Thus, the surface area refers to the surface area that is horizontal when top planar surface 202 is disposed horizontally. Thus, if first sloped region 210 were perfectly perpendicular to top planar surface 202, then first sloped region 210 would have no surface area. The surface area of the first depression, for the purposes of this application, includes the combined surface area of the first and the second depressions. The first depression has a depth relative to top planar surface 202. In the example illustrated, the depth of the first depression is the distance between first planar region 212 and top surface 202. The second or secondary depression also has a depth relative to top planar surface 202. This depth is the maximum distance within the second or secondary depression and the top planar surface. In some embodiments, the depth of the second depression is at least $1/4^{th}$ or even $1/3^{rd}$ greater than the depth of the first depression. The molds of the present invention have a major width dimension of less than 6 inches and 4 inches, and a maximum depth of less then 1 ½ inches, 1 inch, and ¾ inch, in various embodiments In use, a yolk can be deposited into the second depression while an egg white is deposited into the first depression. The yolk may be a whole intact yolk, a whole egg broken yolk, or a formulated yolk, depending on the embodiment. In some methods, the yolk is deposited into the second depression first, followed by depositing the egg white, either natural, enhanced, or formulated. In other methods, the egg is deposited at once, and the yolk allowed to settle into the second depression. In one such method, the yolk is a formulated yolk, having a heavier density than the egg white. The heavier density formulated yolk thus settles into the second depression while the egg white is primarily located within the first depression. Pan 200 can then be subjected to heating, thus cooking the egg products within the molds. The pan can then be inverted and the cooked egg products dislodged. The resulting egg products will have the yolk portion prominently displayed, resembling a grill fried sunny side up cooked egg. The resulting cooked egg can be a natural whole egg, or an egg having a formulated yolk and/or white portion.

Figure 8:
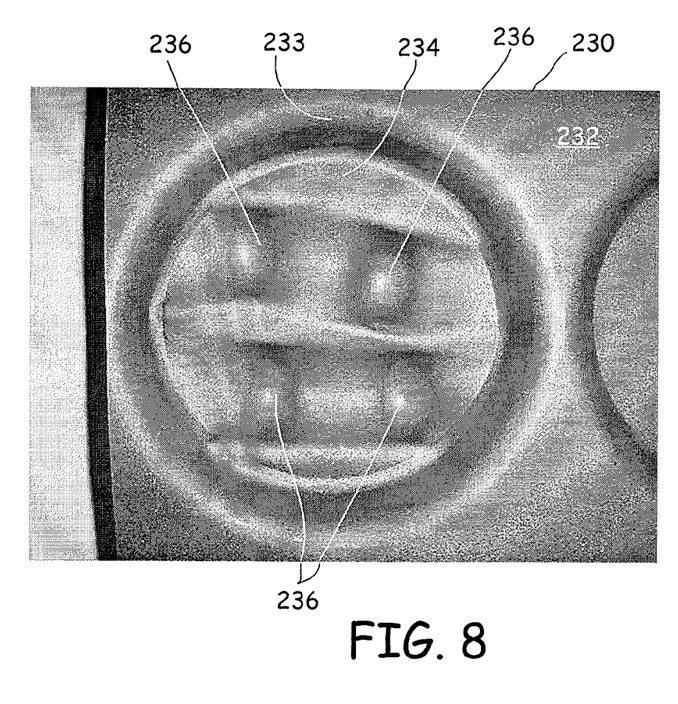
FIG. 8 is a top view photograph of a pan having a mold having a first depression and four more depressions within the first depression.

FIG. 8 illustrates another cooking pan 230 according to the present invention. Pan 230 includes a top planar surface 232 and a mold 233. Mold 233 includes generally a first depression 234 and four secondary depressions 236 formed within primary depression 234. As may be seen from inspecting FIG. 8, both primary depression 234 and secondary depressions 236 have a substantially smooth appearance.

Figure 9:
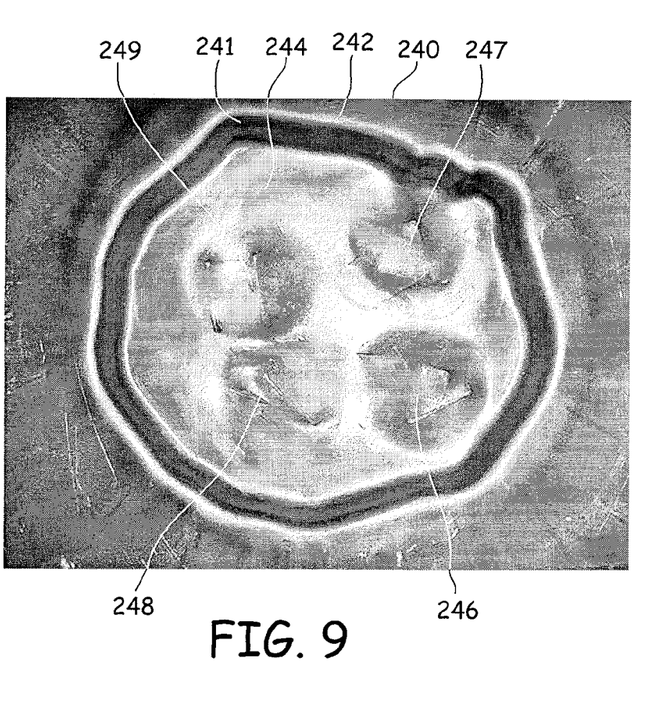
FIG. 9 is a top view photograph of a pan having a mold having an irregular shaped outline, an irregular depth bottom surface, a first depression, and four more depressions within the first depression.

FIG. 9 illustrates another cooking pan 240 having a mold 241 therein. Mold 241 includes an irregular shaped outline 242 and a primary depression 244. Primary depression 244 includes four secondary depressions 246, 247, 248, and 249, each having an irregular surface. The depth of the secondary depressions may be seen to vary over the area of the secondary depressions. In the examples illustrated in FIGS. 8 and 9, the four secondary depressions are each roughly disposed within one quadrant of the mold.

Figure 10:
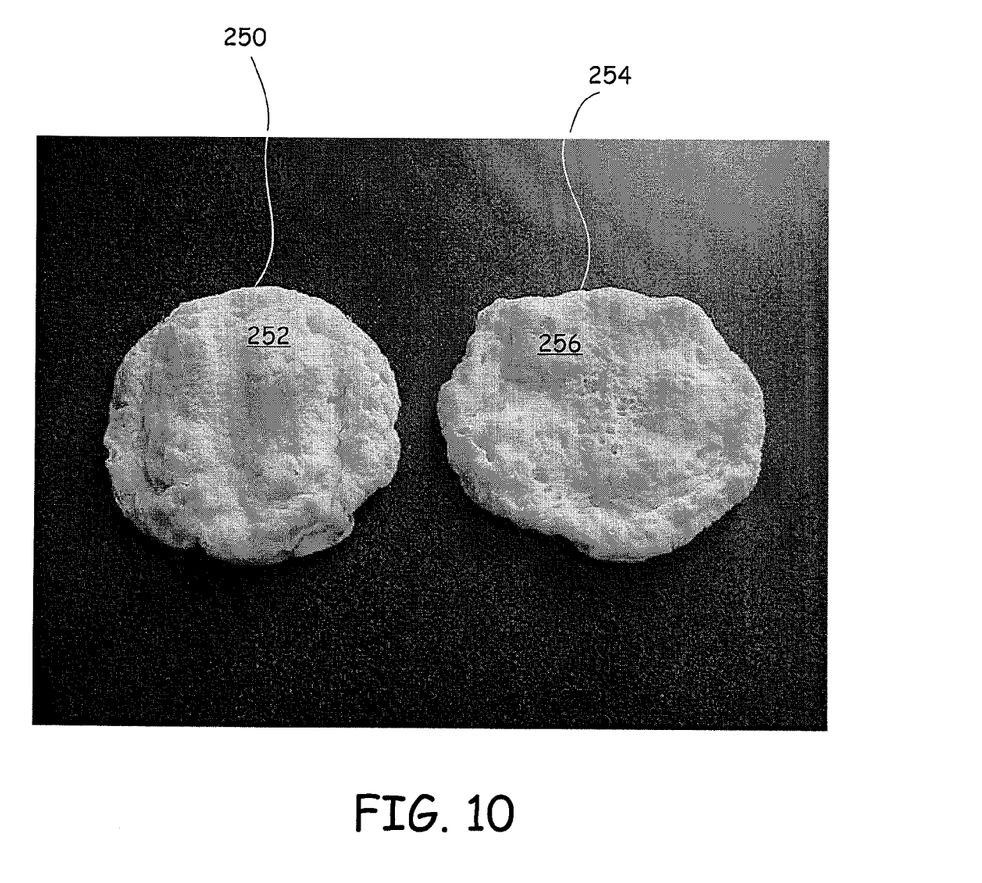
FIG. 10 is a top view of a cooked egg product made using the molds of FIGS. 8 and 9.

FIG. 10 illustrates a cooked egg product produced using the molds of FIGS. 8 and 9. Cooked egg product 250 may be seen to have an irregular height surface 252 thereover, the result of being cooked using mold 233 of FIG. 8. Another cooked egg product 254 is also seen, having an irregularly varying height surface 256. Cooked egg product 254 is the result of an egg product being cooked in mold 241 of FIG. 9. Both cooked egg products 250 and 254 may be seen to have four raised regions, one in each quadrant, the result of being cooked in the secondary depressions of the molds of FIGS. 8 and 9. The irregular height of cooked egg product 250 is also the result of the raised ridge regions of the primary depression relative to the secondary depression in mold 233 of FIG. 8.

The irregularly varying height of the cooked egg products in FIG. 10 more closely resemble home cooked egg products. In particular, some cooked egg products made using this method more closely resembled grill fried scrambled eggs that have been disturbed or moved during the cooking process, as with a spatula. The eggs may also resemble eggs having a lighter or fluffier consistency, relative to similar eggs having a planar, flat or regularly rounded surface. Inspection of the egg products of FIG. 10 also show that in this embodiment of the invention, that there exists no axis of symmetry about which the raised portions appear identical or mirror images of each other.

Figure 11:
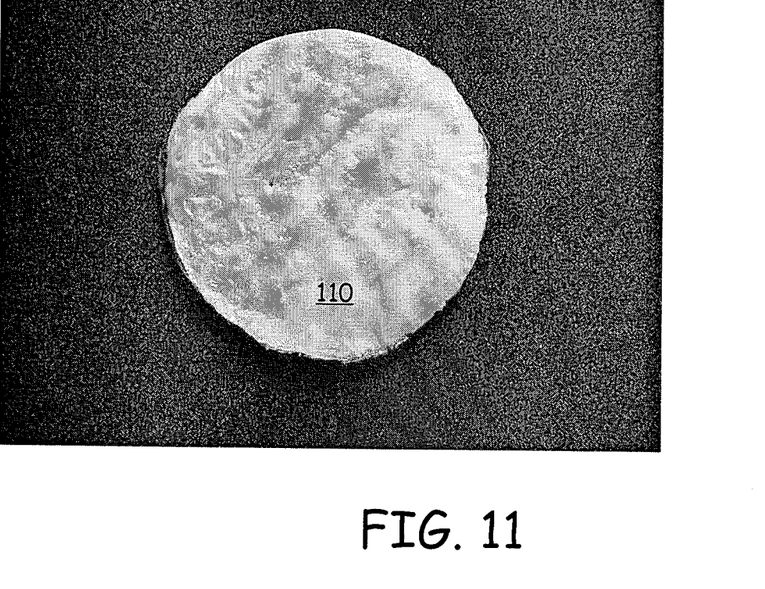
FIG. 11 is a photograph of a whole egg having a broken yolk and a substantially regular outline.
Figure 12:
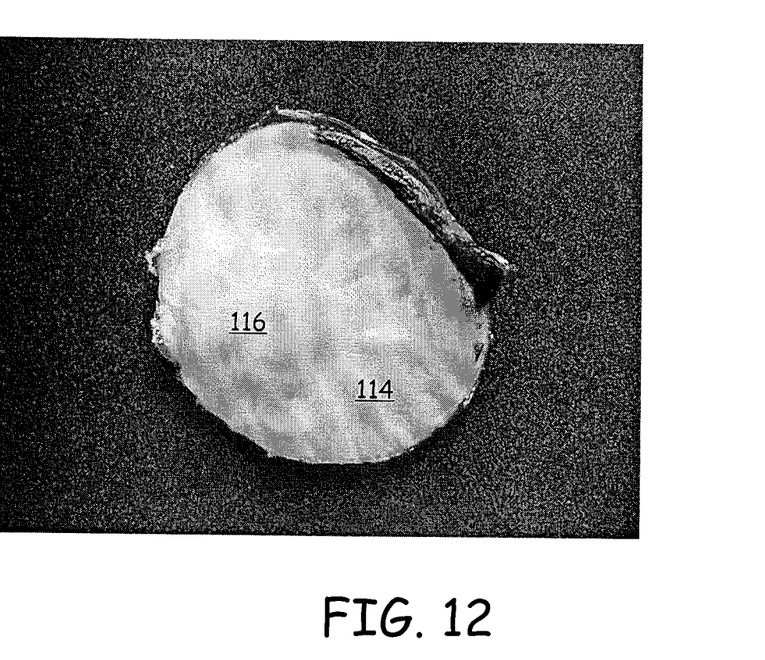
FIG. 12 is a photograph of a whole cooked egg having an unbroken yolk.

FIG. 11 illustrates a cooked egg 110 having a broken yolk. FIG. 11 may be contrasted with FIG. 12, illustrating an egg 114 having an intact yolk 116. As is discussed below, the present invention also includes methods and apparatus for breaking the yolks prior to depositing the eggs. The methods and apparatus used to break the yolks can accomplish this task rapidly, allowing for incorporation of the devices to mass produce cooked eggs having broken yolks.

The present invention also includes devices for mass producing eggs having a grill fried egg appearance. The mass produced, cooked, and cooled egg products can include the intact or broken egg yolk products, and/or the irregular shaped cooked egg products previously described.

Figure 13:
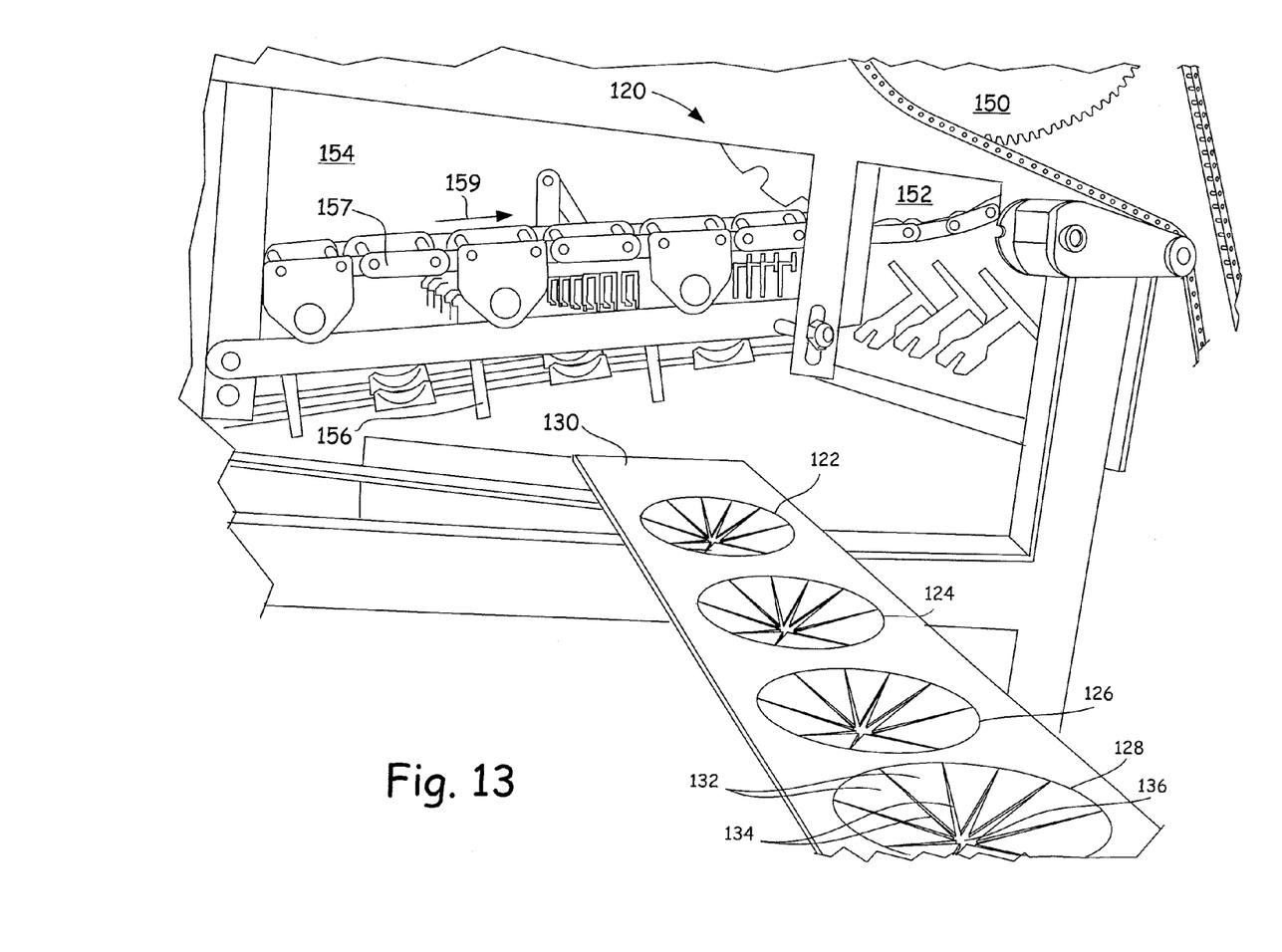
FIG. 13 is a perspective view of a egg yolk breaking device that can be used to make the broken yolk cooked egg of FIG. 11, the breaking device shown partially retracted from an egg breaking machine.

FIG. 13 illustrates an egg yolk splitting or rupturing device 130. Yolk rupturing device 130 includes a first depression 122, a second depression 124, a third depression 126, a fourth depression 128, and a fifth depression (not shown). Egg yolk breaking device 130 can be formed from a Teflon-coated pan having four inch round depressions stamped into the pan which can be about 0.65 inches in depth. These depressions can be positioned to align with mold depressions in the cooking belt underneath.

In the embodiment illustrated, the bottom of each depression was cut into eight equal segments 132 separated by openings 134 therebetween. The segments thus formed were then bent downward to form an opening for the liquid egg contents to pass through. As the liquid egg white and yolk fall through this opening, the pointed portion of each segment ruptures the membrane of the yolk sac, causing it to break. Varying degrees of yolk spread on the finished fried egg can be achieved by changing the size of the opening on the yolk breaker. After the egg passes through the egg yolk breaker, it can be deposited into the mold on the cooking oven to be cooled. The segments meet at a central aperture 136 formed at the vertices of the segments. The segments can have sharp edges, both along their sides and at their vertices, which can rupture the egg yolk sac. The present invention includes generally any device having an aperture with sharp edges, internal or external, for rupturing the egg yolk sac.

FIG. 13 shows that egg yolk breaking device 130 can be used as part of an egg breaking machine 120. Egg breaking machine 120 may be seen to have a belt 157 carrying numerous egg carriers 156. Belt 157 is driven by a first toothed wheel 154 and a second toothed wheel 152 (not illustrated in FIG. 13). A large gear 150 may be seen for driving wheels 152 and 154. In normal operation, belt 157 moves toward the right, indicated at arrow 159. Egg breaking machines and egg carriers are well known to those skilled in the art, with some being further described in U.S. Pat. Nos. 5,617,782 and 6,234,070, both herein being incorporated by reference.

Figure 14:
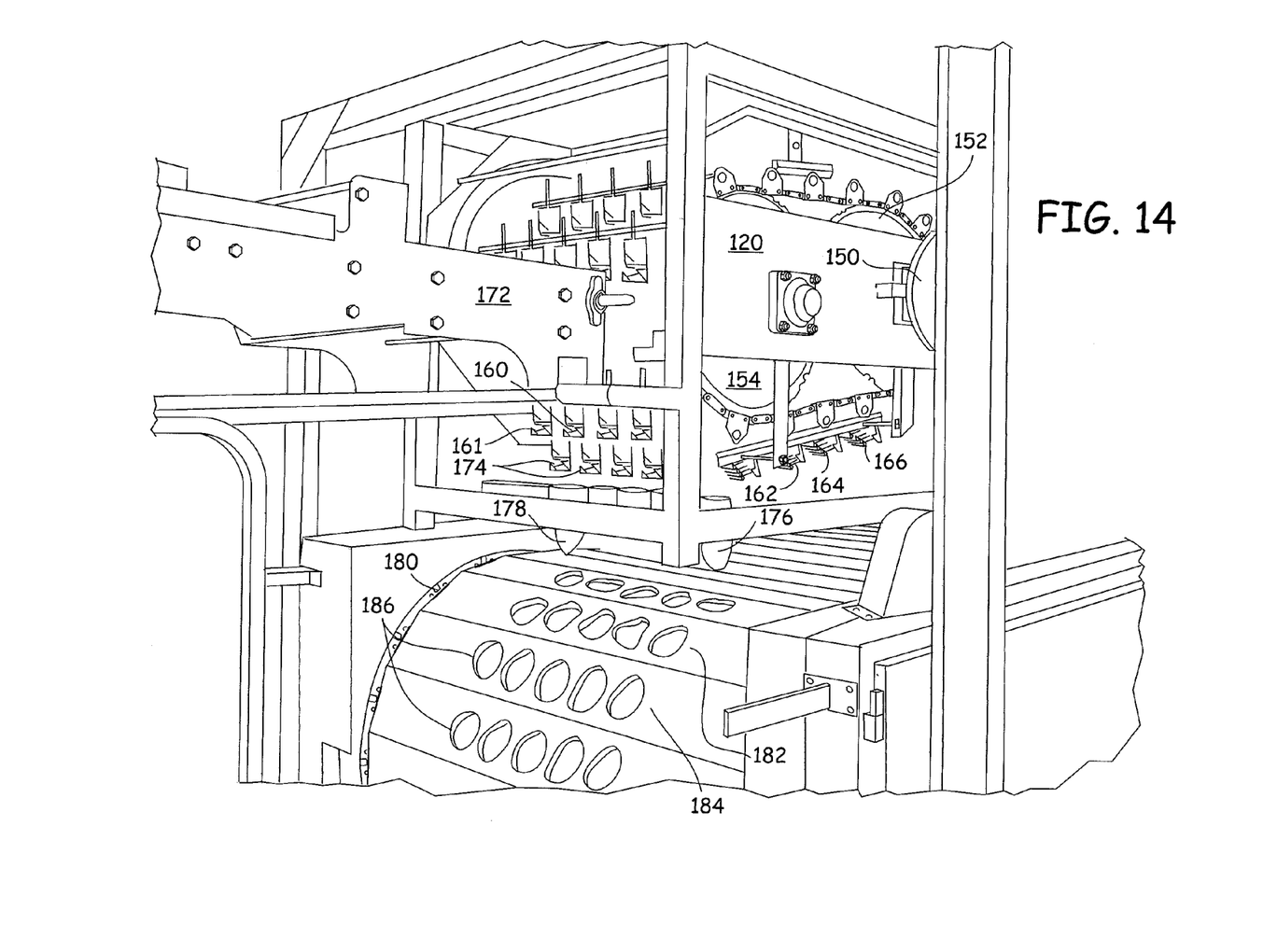
FIG. 14 is a perspective view of an egg breaking machine having several vertical egg carrying carousels disposed side-by-side for breaking shelled eggs and dropping the liquid eggs through five deflectors or chutes into cooking molds disposed under the five chutes.

FIG. 14 illustrates egg breaking device 120, previously introduced in FIG. 13. First toothed wheel 154, second toothed wheel 152, and drive gear 150 may be noted, to orient device 120 with respect to the view previously shown in FIG. 13. The egg carriers of device 120 are carried by a closed loop chain or belt that carries egg carriers 162, 164, and 166, beneath first toothed wheel 154 and traveling toward the right in FIG. 14. Other egg carriers 168 and 170 (illustrated in FIG. 16) are disposed above first toothed wheel 154 and travel toward the left in FIG. 14. In normal operation, a whole shelled egg conveyor 172 delivers whole, shelled eggs to the egg carriers which each carry an egg downward in a substantially vertical fashion, then breaking the shells, and depositing the whole eggs onto the cooking pans of the equipment.

The egg carriers may be seen to form 5 side-by-side columns of egg carriers, for example, egg carriers 160 and 161, disposed alongside each other and traveling vertically downward at one point. The egg breaking device of FIG. 14 may be considered to be, or include, a plurality of vertically disposed carousels disposed in a side-by-side fashion. The carousels could be considered to be circular or circular in at least a part of the belt or chain length, conveying the egg carriers about a closed loop path each lying substantially within a vertical plane.

The egg carriers at the position indicated at 174 are disposed directly above five chutes or deflectors including a right-most chute or deflector 176 and a left-most chute or deflector 178. The illustrated embodiment utilizes a conventional egg breaking machine, a Diamond W80 modified for the present use. A belt 180 having a plurality of pans, for example, pans 182 and 184 may be seen. Each of the pans includes a plurality of molds or depressions 186. Depressions 186 may be seen located a distance apart that is greater than the distance separating egg carriers 160 and 161. In order to deposit the falling eggs coming from egg carriers 160 and 161 into the more widely separated molds 186, chutes or deflectors 176 through 178 may be used to laterally disperse the falling whole liquid eggs. In the example illustrated in FIG. 14, belt 180 is traveling toward the right, toward an oven. In some embodiments, for producing cooked eggs having broken yolks, yolk breaking device 130 can be interposed between the egg carriers at 174 and chutes or deflectors 176 through 178. The falling, whole eggs can have the yolks ruptured prior to falling through the chutes, allowing eggs with broken yolks to fall into the cooking pans below.

Figure 15:
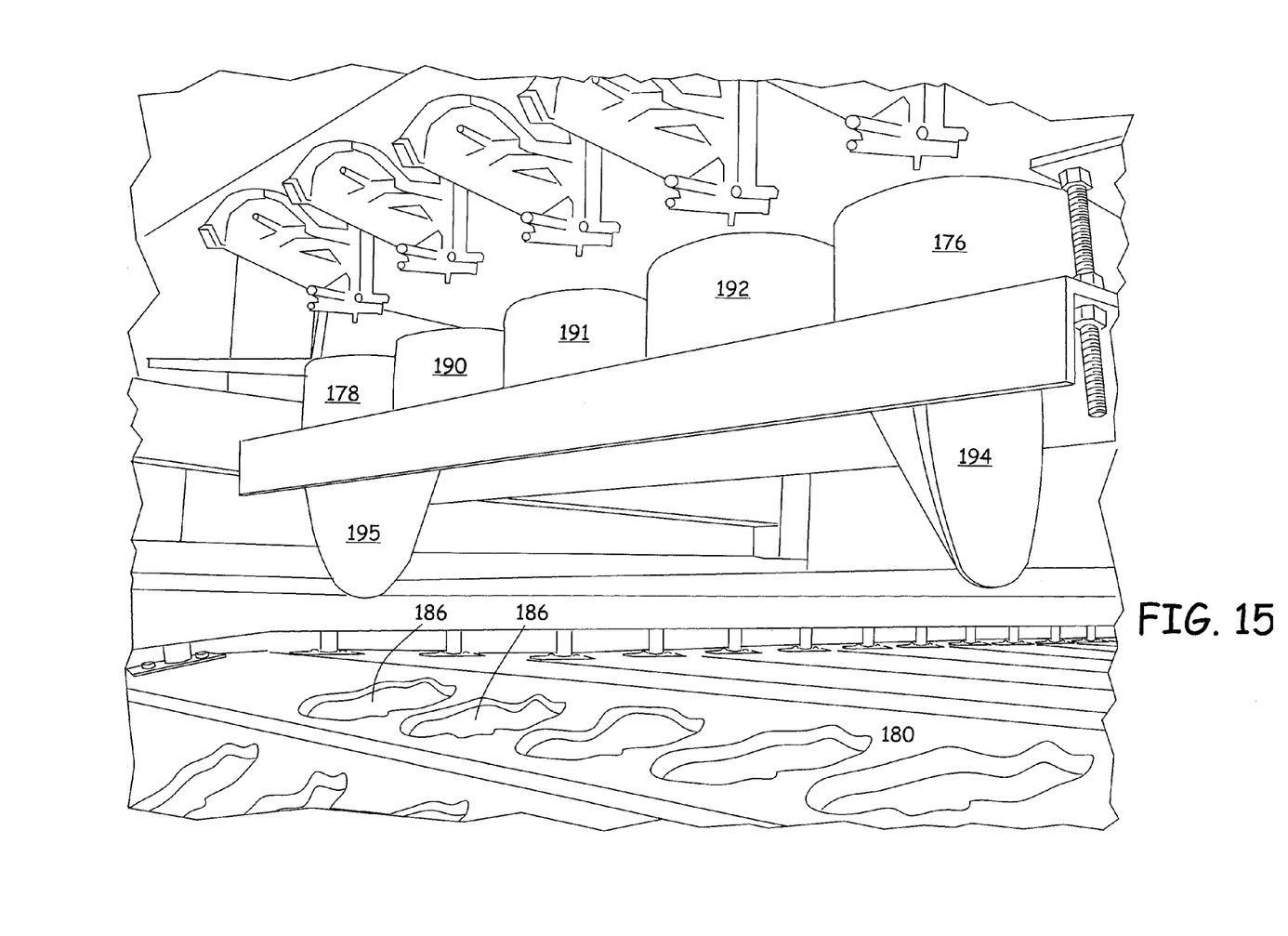
FIG. 15 is a perspective view of the five deflectors or chutes of FIG. 14, adapted to receive falling eggs from the narrowly-spaced vertical egg carrying carousels and for depositing the liquid whole eggs into wider-spaced cooking molds.

FIG. 15 illustrates the moving cooking belt having numerous pans 180 and depressions or molds 186 described with respect to FIG. 14. Chutes or deflectors 176 and 178 may be seen in FIG. 15 as previously described. Left-most chute or deflector 178 may be seen to have a laterally outwardly sloped portion 195 and chute or deflector 176 may be seen to have an outwardly sloped portion 194. Portions of the middle three chutes or deflectors 190, 191, and 192 may also be seen in FIG. 15.

Figure 16:
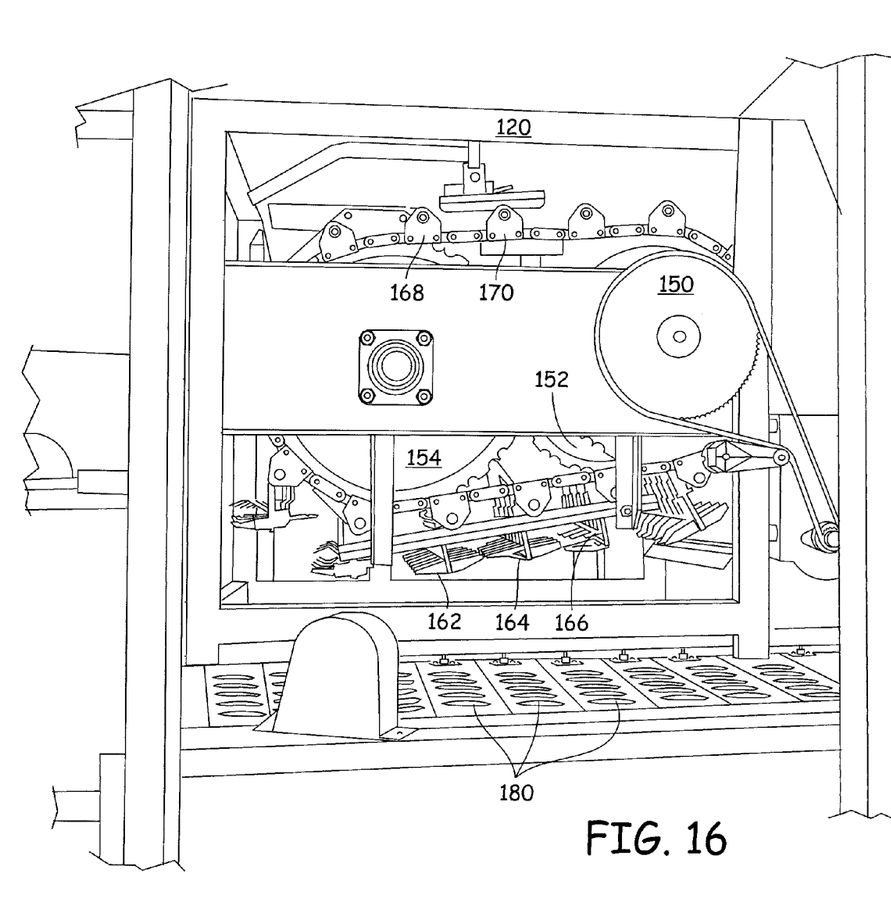
FIG. 16 is a side view of the egg breaking carousel device of FIG. 14, where the shelled eggs could be broken and dropped at the left onto the rotating belt of cooking molds.

FIG. 16 illustrates device 120 from the side. Egg carriers 168, 170, 162, 164, and 166 may be seen as previously described. Drive gear 150 and toothed wheels 154 and 152 may also be seen. Cooking pans 180 may be seen heading rightward toward the cooking oven.

Device 120, in the embodiment illustrated, is based on a modified Diamond W80 egg breaker (Diamond Automation, Farmington Hills, Mich.). Modifications to the diamond W80 breaker can include shortening the in-feed conveyor, modifying the frame, and electronic control changes to synchronize the egg breaking equipment with the cooking oven. Eggs can be loaded manually onto the in-feed conveyor by means of a vacuum assist mechanism. The eggs can then be positioned into lanes by a series of guide rods. These eggs can then be transported via spool conveyor rollers to the egg loader where they are deposited into individual egg holders or egg carriers. The eggs can then be cracked with a knife attachment and the shell spread, allowing the egg contents to drop into the yolk breaking device. The empty egg shells can then be automatically deposited into an auger, which conveys the shells to a holding hopper. The oven, which can be referred to as a mold oven, can be a 40-foot gas-fired forced convention oven, made for example by Wolverine-Proctor & Schwartz (Merrimac, Mass.). The cooked eggs can then be cooled in a spiral freezer and packaged. All of the modifications in this paragraph are well within the abilities of those skilled in the art, provided the teachings of the present inventory.

The detailed description above should be read with reference to the drawings, in which like elements in different drawings are numbered identically. The drawings, which are not necessarily to scale, depict selected embodiments and are not intended to limit the scope of the invention. Several forms of invention have been shown and described, and other forms will now be apparent to those skilled in art. It will be understood that embodiments shown in drawings and described above are merely for illustrative purposes, and are not intended to limit the scope of the invention as defined in the claims that follow.

The invention claimed is:

1. A method for mass producing cooked eggs, the method comprising:
    dropping an egg having a yolk and a white through a device to break the yolk sac, wherein the device comprises a plate including one or more openings formed by a plurality of segments including sharp edges and/or pointed portions to rupture the yolk sac while passing through an opening, the segments being downwardly inclined and separated therebetween to form the openings to allow the egg to pass through;
    depositing an egg product into a plurality of molds;
    cooking the deposited egg products in the molds;
    removing the cooked egg products from the molds; and
    cooling the cooked egg products below room temperature.

2. A method as in claim 1, wherein the method includes allowing the egg having a ruptured yolk sac to fall into one of the plurality of molds.

3. A method as in claim 1, wherein the molds are arranged side to side along a width dimension and end to end along a length dimension, in which the depositing includes depositing a plurality of egg products along the width into the plurality of molds at substantially the same time.

4. A method as in claim 3, in which the depositing includes depositing the plurality of egg products along the width while the molds are moving along the length dimension.

5. A method as in claim 1, wherein the method further comprises introducing whole eggs spaced a first distance apart from each other and breaking the shells of said whole eggs, followed by diverting the resulting eggs in the width dimension to a second distance apart from each other so as to permit the egg products to drop into the molds.

6. A method as in claim 1, wherein each of the molds has a first depression and second depression disposed within the first depression, wherein the depositing includes depositing the egg product into the first and second depressions.

7. A method as in claim 6, wherein the egg product includes whole eggs having intact yolks, wherein the depositing including depositing the whole eggs and allowing the yolks to settle into the second depression.

8. A method as in claim 7, wherein each of the molds includes a bottom surface and has a depth that varies irregularly over the bottom surface.

9. A method for breaking egg yolks comprising:
dropping the egg yolks through a device for rupturing the egg yolk sacs, the device comprising a plate including one or more orifices and further having a plurality of segments including sharp edges that protrude inwardly to rupture the yolk sacs of the egg yolks passing through the orifices, the segments being downwardly inclined and separated therebetween to form the one or more orifices to allow the egg to pass through.

10. A method as in claim 9, wherein the device has a plurality of orifices.

11. A method as in claim 10, wherein each of the plurality of orifices is disposed in a downwardly extending plate portion.

12. A method for mass producing cooked eggs, the method comprising:
dropping one or more eggs through a device to break the yolk sac, wherein the device comprises a plurality of openings and includes a plurality of segments having sharp edges and/or pointed portions to rupture the yolk sac, the segments being separated therebetween to form the openings to allow the egg to pass through;
depositing egg products having yolks into a plurality of molds, wherein each of the molds has a first depression and second depression disposed within the first depression;
allowing the yolks to settle into the second depressions;
cooking the deposited egg products in the molds;
removing the cooked egg products from the molds; and
cooling the cooked egg products below 30 degrees Celsius.

13. A method as in claim 12, wherein the egg products include whole eggs, in which the depositing includes depositing the whole eggs.

14. A method as in claim 12, in which the egg products include formulated eggs and the yolks are formulated yolks, in which the depositing includes depositing the formulated yolks into the second depression.

15. A method as in claim 12 further comprising:
mechanically conveying a plurality of whole eggs to the molds, each of the whole eggs having a shell and egg contents including an egg yolk and an egg white;
mechanically breaking the shells of the conveyed plurality of whole eggs prior to depositing, so as to provide a plurality of eggs for the dropping step;
allowing the egg contents to fall into a plurality of molds, wherein each mold receives the contents of only one egg; and
mechanically conveying the molds containing the egg contents into a heating area for the cooking step.

16. A method as in claim 15, wherein the mechanically conveying includes mechanically carrying each egg in a carrier.

17. A method as in claim 15, wherein the mechanical breaking of an egg shell includes breaking the egg shell with a knife.

18. A method as in claim 1, wherein the dropping comprises dropping a plurality of eggs and wherein the molds are arranged side to side along a width dimension and end to end along a length dimension, and in which the depositing includes depositing a plurality of egg products along the width into the plurality of molds at substantially the same time.

19. A method as in claim 18, in which the depositing includes depositing the plurality of egg products along the width while the molds are moving along the length dimension.

20. A method as in claim 1, wherein each of the molds has an irregular shaped peripheral boundary.

21. A method as in claim 15, in which the egg conveying, egg breaking, and mold conveying include mechanisms selected from the group consisting of pneumatic, electrical, magnetic, hydraulic, purely mechanical, and electro-mechanical mechanisms and combinations thereof.

22. A method as in claim 21, in which the molds are joined together into a closed loop of linked molds, and in which the mold conveying includes moving the loop of linked molds toward the heating area.

23. A method as in claim 15, in which each of the molds has a first depression and second depression located within the first depression, said method further comprising disposing the egg yolk in the second depression.

24. A method as in claim 15 wherein each of the molds includes a surface that is formed of a non-stick, food grade material.

* * * * *